(12) United States Patent
Couturier et al.

(10) Patent No.: US 7,010,795 B2
(45) Date of Patent: *Mar. 7, 2006

(54) PROCESS FOR SENDING A NOTIFICATION IN A DATA PROCESSING NETWORK WITH DISTRIBUTED APPLICATIONS

(75) Inventors: Alban Couturier, Paris (FR); Michel Ruffin, Rueil Malmaison (FR); Marcel Van Der Meulen, Paris (FR)

(73) Assignee: Alcatel, Paris (FR)

( * ) Notice: Subject to any disclaimer, the term of this patent is extended or adjusted under 35 U.S.C. 154(b) by 266 days.

This patent is subject to a terminal disclaimer.

(21) Appl. No.: 10/339,354

(22) Filed: Jan. 10, 2003

(65) Prior Publication Data

US 2003/0110310 A1 Jun. 12, 2003

Related U.S. Application Data

(63) Continuation of application No. 09/070,868, filed on May 1, 1998, now Pat. No. 6,546,432.

(30) Foreign Application Priority Data

May 2, 1997 (FR) .................................. 97 05452

(51) Int. Cl.
*G06F 9/46* (2006.01)

(52) U.S. Cl. .................................... 719/318

(58) Field of Classification Search ................. 719/318, 719/316, 315; 709/224, 223; 714/25, 39, 714/48; 340/506
See application file for complete search history.

(56) References Cited

U.S. PATENT DOCUMENTS

| 4,870,571 | A | * | 9/1989 | Frink ......................... 709/224 |
| 5,155,842 | A | * | 10/1992 | Rubin ........................ 714/22 |
| 5,283,856 | A | * | 2/1994 | Gross et al. ................. 706/47 |
| 5,327,349 | A | * | 7/1994 | Hoste ......................... 700/110 |
| 5,519,780 | A | * | 5/1996 | Woo et al. .................. 725/137 |
| 5,604,487 | A | * | 2/1997 | Frymier ..................... 340/5.9 |
| 5,696,486 | A | * | 12/1997 | Poliquin et al. ............ 340/506 |
| 5,752,159 | A | * | 5/1998 | Faust et al. ................ 725/105 |

(Continued)

FOREIGN PATENT DOCUMENTS

EP 0759591 2/1997

(Continued)

OTHER PUBLICATIONS

ICL Proposal in Response to OMG Ojbect Service RFP 1, Feb., 1993, Chapter 6.*

*Primary Examiner*—Sue Lao

(57) ABSTRACT

In a data processing network with distributed applications a notification is sent from a sender to a receiver via a notification service with which the receiver is registered in order to receive notifications satisfying a predetermined test criterion. The predetermined test criterion includes comparison of at least two values concerning the sender object. Applications include telecommunication networks.

10 Claims, 1 Drawing Sheet

U.S. PATENT DOCUMENTS

| | | | | |
|---|---|---|---|---|
| 5,768,501 A | * | 6/1998 | Lewis | 714/48 |
| 5,777,549 A | * | 7/1998 | Arrowsmith et al. | 340/506 |
| 5,854,898 A | * | 12/1998 | Riddle | 709/231 |
| 5,984,366 A | * | 11/1999 | Priddy | 283/72 |
| 6,073,184 A | * | 6/2000 | Couturier et al. | 719/313 |
| 6,131,112 A | * | 10/2000 | Lewis et al. | 709/207 |
| 6,446,134 B1 | * | 9/2002 | Nakamura | 719/313 |
| 6,446,136 B1 | * | 9/2002 | Pohlmann et al. | 719/318 |
| 6,481,005 B1 | * | 11/2002 | Crowley et al. | 717/100 |
| 6,487,590 B1 | * | 11/2002 | Foley et al. | 709/223 |
| 6,546,432 B1 | * | 4/2003 | Ruffin et al. | 719/318 |
| 6,741,171 B1 | * | 5/2004 | Palka et al. | 340/501 |
| 6,832,341 B1 | * | 12/2004 | Vijayan | 714/43 |

FOREIGN PATENT DOCUMENTS

EP    0759591 A1 *  2/1997

* cited by examiner

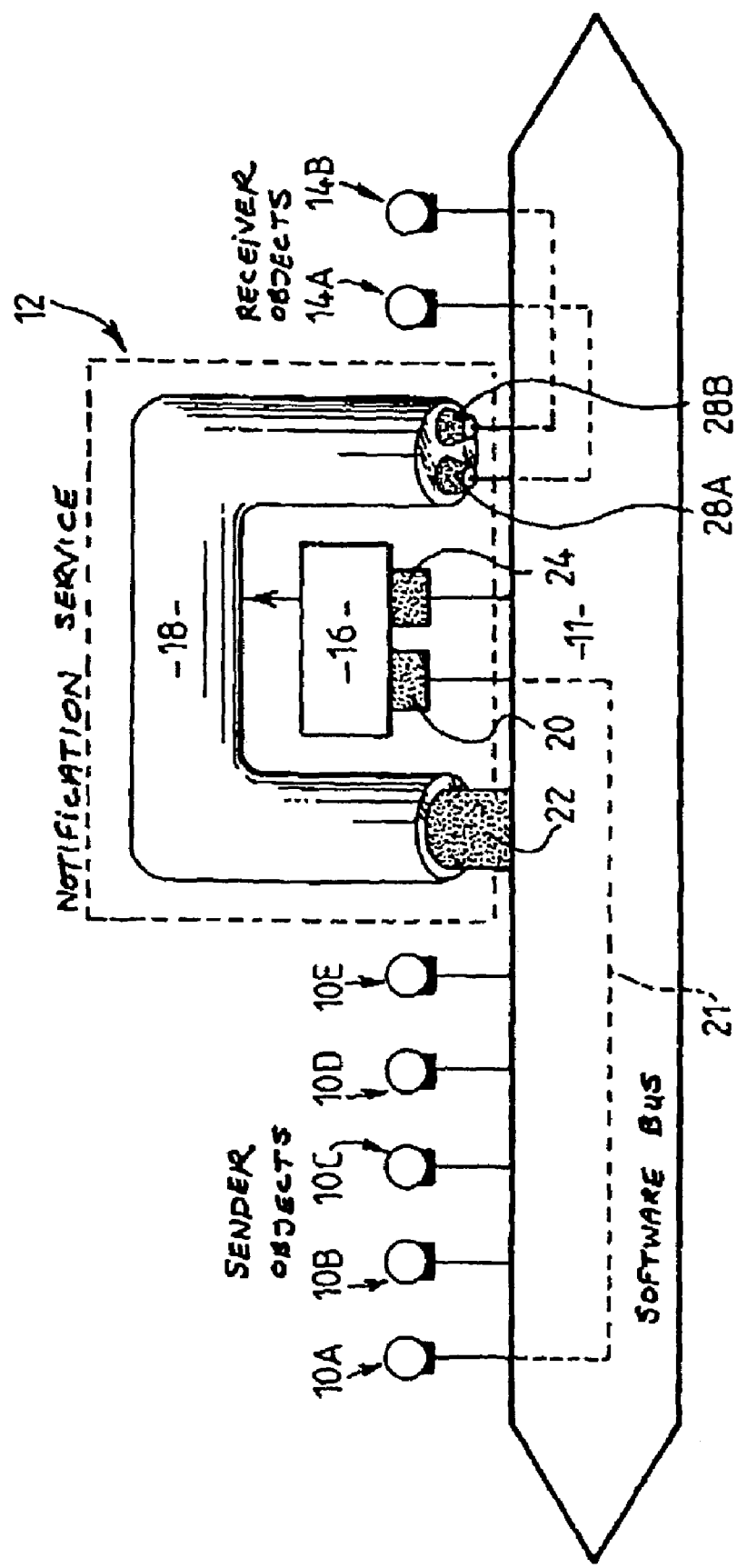

PROCESS FOR SENDING A NOTIFICATION IN A DATA PROCESSING NETWORK WITH DISTRIBUTED APPLICATIONS

This is a continuation of application Ser. No. 09/070,868 filed May 1, 1998, now U.S. Pat. No. 6,546,432, the disclosure of which is incorporated herein by reference.

BACKGROUND OF THE INVENTION

1. Field of the Invention

The present invention concerns a process for sending a notification in a data processing network with distributed applications. It also concerns a network using the aforementioned process.

The invention applies in particular to the distributed object architecture of networks conforming to the "Common Object Request Broker Architecture" (CORBA) specification of the "Object Management Group" (OMG).

2. Description of the Prior Art

In the aforementioned architecture the objects are distributed between the various data processing units in the network. They communicate via a software bus which is called the "Object Request Broker" (ORB) in the CORBA specification.

The expression "software bus" designates the entity enabling objects to send and to receive requests in a distributed environment. The distributed applications are installed on data processing units communicating with each other via the physical medium to which the data processing units forming the network are connected and via the lower layers of the communication protocol, for example the IP (Internet Protocol) and TCP (Transmission Control Protocol) layers.

The data processing units are switches of a telecommunication network, for example, or a set of workstations connected to one or more printers.

In a network of the above kind the objects, wherever they are on the network, provide services to client objects which send requests for such services over the network. The role of the software bus (ORB) is to deliver the requests to the server objects concerned and to return the output values to the client objects. This operation is transparent as far as the client object is concerned. The latter does not know where the objects reside on the network, how they are implemented, how they are stored in memory or how they are executed. In order to submit a request the client object only needs to know the reference of the object.

In accordance with the CORBA specification each distributed object has a communication interface written in IDL (Interface Definition Language). The IDL interface provides a static definition of the interfaces of the objects enabling objects to be ported between different object versions.

The result of compiling the IDL interface is tied to the implementation of the object.

Accordingly, the client object can interact with a remote server object simply by invoking the IDL functions as a local object without concerning itself with the situation of the server object on the network. To this end the client object can use the format of the communication interface of the server object to submit its request.

In networks of the above kind large quantities of data are transmitted directly and synchronously from a sender object to a receiver object connected to the same software bus.

Large quantities of data pass through notification servers. The latter receive notifications from sender objects registered as such with the notification service. Receiver objects registered as receiver objects and having indicated one or more predetermined test criteria for filtering notifications sent to them on the basis of the data that they contain receive from the notification service notifications that satisfy the predetermined test criteria.

The filtering methods are particularly useful for reducing the quantity of data transmitted over the network and for adapting the notification service to suit the needs of each receiver object.

The filters can be declared dynamically and modified.

The data transmitted by the sender objects in the form of notifications is structured into fields or attributes containing values specific to each sender object and concerning the latter.

Filtering consists in identifying certain fields in the data structure and carrying out a comparison based on the values of these fields and in accordance with the description of the filter.

Only the notifications for which the extracted values satisfy the predetermined test criteria are transmitted to the receiver object.

In such networks the filtering methods employed use simple structure tests that are not capable of effective filtering. In particular, these filters do not assure efficient filtering and do not use sufficiently sophisticated test criteria. Also, they are not able to limit effectively the traffic to the receiver objects so that the latter receive only the data they need.

Given the above, the network carries a large quantity of data of little relevance, unnecessarily increasing the traffic on the network.

An aim of the invention is to solve this problem and in particular to propose a transmission process and a network using the process in which efficient filtering effectively reduces the volume of communications whilst enabling network operation imperatives to be satisfied.

SUMMARY OF THE INVENTION

To this end, the invention consists in a process for sending a notification in a data processing network with distributed applications from a sender to at least one receiver via a notification service with which the receiver or each receiver is registered in order to receive notifications satisfying a predetermined test criterion, wherein:

the sender sends to the notification service a notification including a set of at least two values concerning the sender;

for each registered receiver, the notification service checks if the set of values satisfies the predetermined test criterion associated with the receiver;

the notification service sends the notification concerning the sender to the receiver if the predetermined test criterion is satisfied; and the predetermined test criterion includes comparison of the at least two values concerning the sender.

Particular embodiments of the process can have one or more of the following features:

the network includes a plurality of senders, each sender sends to the other senders at least one particular value representative of information concerning it, the set of values of the notification sent by the sender to the notification service includes a value which depends on at least one of the particular values received by the sender, and the comparison is effected between the value which is dependent on at least one of the particular values and a value concerning the sender;

the sender or each sender is adapted to monitor the operation of a resource and the values compared constitute information representative of the functional status of the resource; and the predetermined test criterion is defined by the receiver when it is registered with the notification service.

The invention further consists in a data processing network with distributed applications including at least one sender, at least one receiver and a notification service with which the receiver or each receiver is registered in order to receive notifications satisfying a predetermined test criterion, wherein:

the sender or each sender includes means for sending to the notification service a notification including a set of at least two values concerning the sender;

the notification service includes means for verifying, for each registered receiver, if the set of values satisfies the predetermined test criterion associated with the receiver;

the notification service includes means for sending the notification concerning the sender to the receiver if the predetermined test criterion is satisfied; and the predetermined test criterion includes comparison of at least two values concerning the sender.

Particular embodiments of the network can have one or more of the following features:

it includes a plurality of senders, each sender includes means for sending to the other senders at least one particular value representative of information concerning it, the set of values of the notification sent by the sender to the notification service includes a value dependent on at least one of the particular values received by the sender, and the predetermined test criterion includes comparison of the value dependent on at least one of the particular values and a value concerning the sender;

the sender or each sender is adapted to monitor the operation of a resource and the values compared constitute information representative of the functional status of the resource;

the receiver includes means for defining the predetermined test criterion when it is registered with the notification service; and at least one of the senders and receivers is an object.

The invention further consists in a communication unit of a data processing network with distributed applications, which network includes at least one sender and at least one receiver, the communication unit including a notification service with which the receiver or each receiver is registered in order to receive notifications satisfying a predetermined test criterion, the sender or each sender including means for sending to the notification service a notification including a set of at least two values concerning the sender, the notification service including means for verifying, for each registered receiver, if the set of values satisfies the predetermined test criterion associated with the receiver and means for sending the notification concerning the sender to the receiver if the predetermined test criterion is satisfied, wherein the predetermined test criterion includes comparison of at least two values concerning the sender.

The invention will be better understood after reading the following description given by way of example only and with reference to the appended drawing.

BRIEF DESCRIPTION OF THE DRAWING

The single FIGURE in the appended drawing is a diagrammatic representation of a network of distributed objects in accordance with the invention using a notification service.

DETAILED DESCRIPTION OF THE PREFERRED EMBODIMENT

The following description assumes that each object conforms to the CORBA specification and consequently that objects can communicate with each other simply by submitting requests independently of their situation on the network.

The FIGURE shows five sender objects 10A, 10B, 10C, 10D and 10E. Each of these objects monitors the operation of a separate data processing unit, for example a switch in a telecommunication network. The objects are adapted to assess the functional status of any type of component of the network, whether a software resource or a hardware resource. The objects are distributed across the network and are connected by a software bus 11.

A notification service 12 is connected to the software bus and assures asynchronous communication of data between the network objects.

Receiver objects 14A, 14B are connected to the software bus 11. These objects are assigned to telecommunication network operation monitoring services, for example, and are in particular adapted to detect faults on the network and to advise an operator of them so that action can be taken with regard to them.

The notification service 12 is formed of a set of objects connected to the software bus 11. In particular, it includes a notification server administrator 16 and a notification channel 18 adapted to send notifications received from one of the sender objects to one of more of the receiver objects if the notification data received satisfies a predetermined test criterion formulated by the receiver object when it subscribes to the notification service.

Each sender object 10A through 10E is registered with the notification server administrator 16 via an IDL registration interface 20. Registration is effected by sending a request from the sender object to the interface 20. A request of this kind for the object 10A is symbolized by the arrow 21. Each sender object 10A through 10E, when it is registered, receives the reference and possibly the format of the IDL communication interface 22 of the notification channel 18. The reference enables it to transmit to the notification service 12 notifications including values concerning it. The notifications constitute alarms and are representative of the functional status of the data processing unit with which the sender object is associated.

The structure of an alarm written in IDL is in the following form, for example:

```
struc {
   string name;
   short severity;
   short highestseverity;
   string alarm_reason;
};
``` where:

"name" is the name of the sender object,

"severity" is the severity level on a scale of 1 to 5 of the fault encountered on the data processing unit associated with the corresponding sender object, "highestseverity" is the highest severity level encountered in the set of sender objects 10A through 10E, and "alarm_reason" is a fault identifier.

The sender object assigns a value to each field according to the functional status of the associated unit.

In order to assign a value to the "highestseverity" field, the objects 10A through 10E are adapted to communicate with each other so that if one of the objects sends an alarm reflecting a fault of a particular level in the associated data processing unit all the other objects receive that alarm via their IDL interface.

Moreover, the receiver objects 14A, 14B are registered with the notification service 12 in order to receive notifications concerning them. To this end each receiver object 14A, 14B is registered with a registration IDL interface 24 of the notification server administrator 16. This interface is adapted to register objects connected to the software bus so that the latter receive notifications from the notification service with which they are registered.

Registration is effected in particular by giving the reference of the registered receiver object to the notification server administrator 16.

The notification channel 18, forming a CORBA object, is controlled by the notification server administrator 16. In particular, the notification server administrator 16 registers receiver objects with the notification channel 18 by giving the latter their reference.

When it is registered with the notification service, each receiver also defines a filter for selecting notifications to be sent to it subject to validation of a predetermined test criterion contained in the filter.

According to the filter defined by each receiver object, the notification server administrator 16 commands the configuration of the notification channel 18 to use filters 28A, 28B respectively specific to the receiver objects 14A and 14B. Accordingly the notification channel 18 knows, for each receiver object 14A, 14B, the reference of the object and the test criterion specific to that object.

In accordance with the invention, the predetermined test criterion consists in comparing two values originating from the same sender object and representative of information concerning it.

For example, filtering is effected by comparing levels of the "severity" and "highestseverity" fields so that of all alarms present on the network only alarms having the highest level are transmitted to the receiver objects that have imposed such filtering.

To this end the structure of the filter written in IDL in accordance with the CORBA specification is of the following form:

```
typedef string AttributeId;
struct AttributeValueType
    AttributeId attributeId
    any attributeValue;
    };
struct TwoAttributesType
    AttributeId attributeId1
    AttributeId attributeId2;
    };
```

-continued

```
enum TestType {AttributeWithValue, AttributeWithOtherAttribute};
union AttributeType switch (TestType)
    {
        case AttributeWithValue : AttributeValueType single;
        case AttributeWithOtherAttribute : TwoAttributesType multi;
    };
enum FilterItemType
    equalityChoice,
    greaterOrEqualChoice,
    lessOrEqualChoice,
    };
union FilterItemSwitch (FilterItemType) {
    case equalityChoice       : AttributeType equality;
    case greaterOrEqualChoice : AttributeType greaterOrEqual;
    case lessOrEqualChoice    : AttributeType lessOrEqual;
};
``` where:

"AttributeId" is the identifier of an attribute.

"FilterItem" is a basic test which, associated with other basic tests using logic operators such as AND, OR, NOT, is used to write complex tests.

"FilterItem" is determined by "FilterItemType" which gives the type of test, in the present case, from the following tests: equality, greaterOrEqual, lessOrEqual.

The arguments for the test are stored in "AttributeType".

In accordance with the invention there are two different structures for the test arguments. These are "AttributeValueType", which corresponds to the test effected by comparing a value of a field of the data structure and a predetermined reference value, and "TwoAttributesType", which corresponds to the test effected by comparing two values of fields of the same data structure relating to the same sender object.

For writing the filter these two structures are designated more explicitly, respectively by:

"AttributeWithValue", and

"AttributeWithotherAttribute".

With a filter structure of the above kind, the filtering of the notifications in accordance with the test criterion according to whether the severity level ("severity") of the fault in the data processing unit is greater than or equal to the highest level ("highestseverity") on the network is written in the form:

greaterOrEqual(AttributeType(AttributeWithOtherAttribute){severity, highestseverity})

A filter system of the above kind enhances the facility to select notifications to be sent to the receiver objects. In particular, the filter criteria can evolve with time and the status of the network.

With current filters using only comparison of an attribute value and a reference value the filter criteria cannot evolve in this way.

Although the above description refers to sender and receiver objects, the latter can be conventional software components and in particular conventional procedural programs.

The invention claimed is:

1. A computer implemented method for sending a notification from a sender object to at least one registered receiver object in a data processing network having distributed applications, said at least one registered receiver object receiving notifications from a notification service indicating that a predetermined test criterion has been satisfied, wherein said method comprises:

sending, from said sender object to said notification service, a set of values comprising at least a first value representing a notification message from said sender object, a second value representing a reference level, and a filter control value that determines if said first value is compared against said second value or a preset reference level;

checking if said set of values satisfies said predetermined test criterion associated with said at least one registered receiver object, wherein said notification service checks said set of values with each registered receiver object; and sending an alarm message if said predetermined test criterion is satisfied, wherein said notification service sends said alarm message to said receiver object associated with said predetermined test criterion.

2. The method claimed in claim 1, wherein said network comprises a plurality of sender objects, wherein each sender object forwards to the other sender objects at least one particular value representative of information concerning the forwarding sender object, said set of values sent by said sender object to said notification service includes a value which depends on at least one of said particular values received by said sender object, and said comparison is effected between said value which is dependent on at least one of said particular values and a value concerning said sender object.

3. The method claimed in claim 1, wherein said sender object or each sender object is adapted to monitor the operation of a resource and the values compared constitute information representative of the functional status of said resource.

4. The method claimed in claim 1, wherein said predetermined test criterion is defined by said receiver object when it is registered with said notification service.

5. The method claimed in claim 1, wherein said second value represents a reference level that is dependent at least in part on notifications sent from other sender objects.

6. The method claimed in claim 5, wherein said second value is the highest alarm sent by said other sender objects.

7. The method claimed in claim 1, wherein said predetermined criterion comprises at least a greater than or equal to criterion, a less than or equal to criterion and an equality criterion.

8. The method claimed in claim 7, wherein said predetermined test criterion is associated with logical operators.

9. A computer implemented method for sending a notification from a sender object to at least one registered receiver object in a data processing network having distributed applications, said at least one registered receiver object receiving notifications from a notification service indicating that a predetermined test criterion has been satisfied, wherein said method comprises:

sending, from said sender object to said notification service, a set of values comprising a first value representing a notification being sent by said sender object and a second value representing a reference level against which said first value is compared, wherein said second value is dependent at least in part on notifications received from other sender objects;

checking if said set of values satisfies said predetermined test criterion associated with said at least one registered receiver object, wherein said notification service checks said set of values with each registered receiver object; and sending an alarm message if said predetermined test criterion is satisfied, wherein said notification service sends said alarm message to said receiver object associated with said predetermined test criterion.

10. A computer implemented method for sending a notification from a sender object to at least one registered receiver object in a data processing network having distributed applications, said at least one registered receiver object receiving notifications from a notification service indicating that a predetermined test criterion has been satisfied, wherein said method comprises:

sending, from said sender object to said notification service, a set of values comprising a first value representing a notification being sent by said sender object and a second value representing a reference level against which said first value is compared, wherein said second value is the highest alarm received from other sender objects;

checking if said set of values satisfies said predetermined test criterion associated with said at least one registered receiver object, wherein said notification service checks said set of values with each registered receiver object; and sending an alarm message if said predetermined test criterion is satisfied, wherein said notification service sends said alarm message to said receiver object associated with said predetermined test criterion.

* * * * *